United States Patent Office 3,516,965
Patented June 23, 1970

3,516,965
COMPOSITION OF POLYEPOXIDE AND ORGANO-PHOSPHORUS AMIDE CURING AGENT AND PRODUCT THEREOF
Robert M. Washburn, Whittier, Calif., assignor, by mesne assignments, to McDonnell Douglas Corporation, Santa Monica, Calif., a corporation of Maryland
No Drawing. Filed Jan. 4, 1966, Ser. No. 518,553
Int. Cl. C08g *30/14*
U.S. Cl. 260—47
10 Claims

ABSTRACT OF THE DISCLOSURE

Compositions capable of forming a tough resinous product having high thermal, oxidative and ultraviolet radiation stability, comprising a polyepoxide and as curing and cross-linking agent for said polyepoxide, organophosphorus amides having the

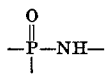

group, and free of primary amino groups which are not connected to phosphorus, preferred amides being those which contain one or preferably a plurality of phenyl groups, such as trisanilinophosphine oxide and phenylbisanilinophosphine oxide. The epoxy systems of the invention are useful in the production of highly resistant and tough coatings, adhesives, laminates and electrical insulation materials.

---

This invention relates to the production of resinous or elastomeric materials, particularly to the production of cured epoxy resins, and is particularly concerned with epoxy resin formulations containing a curing agent, and which formulations are capable of producing a tough resinous product having high thermal, oxidative and ultraviolet radiation stability, with the resinous product so produced, and procedure for producing such resinous product.

A variety of materials have been used as additives to polymeric materials such as epoxy resins to function as anti-oxidants, flame retardants and ultraviolet light stabilizers. Antimony compounds, organic phosphates, and a number of chlorine- and bromine-containing compounds have been used. In general, various inorganic additives such as antimony oxide reduce clarity and adversely affect molding characteristics. Organic phosphates generally have a plasticizing effect which is undesirable in most resin systems. To avoid some of these problems, mixtures of chlorinated wax and antimony oxide have been used in some resin compositions, but generally such mixtures cause the resin compositions to be less stable to ultraviolet radiation. Chlorinated organic phosphates in sufficient quantity to produce a fire resistant material generally act as plasticizers and cause a loss in dimensional stability. Chlorendic acid has been used to impart fire resistance without loss of dimensional stability, but there is a loss in ultraviolet radiation stability.

Certain organophosphorus compounds have been used as additives to polymeric materials. However, the simple addition or organophosphorus compounds to polymeric materials formulations generally causes a detrimental effect on the physical properties of the cured polymeric material. Also, the added compound can "bleed" out or be dissolved out of the cured material.

In order to overcome the disadvantages noted above of using simple additives in polymeric compositions, and to improve the physical properties of the resinous product, particularly cured epoxy resins, it has been found desirable to develop resin formulations, especially epoxy resin formulations, incorporating materials which effect a chemical bonding of the curing material into the polymer matrix. Cured resinous products of this type having improved stability and structural characteristics are especially useful for a wide variety of applications including improved coatings, laminating and impregnating resins, and potting, encapsulating and electrical insulating compounds.

It has been found, according to the invention, that certain organophosphorus-nitrogen compounds are particularly effective as curing and cross-linking agents for various elastomers, and particularly epoxy resins, to produce tough, cured resinous products having the improved physical properties noted above. Such curing agents enter into the reaction and become an integral, chemically bonded part of the polymer or elastomer matrix. As result of such reaction, described in greater detail below, the resulting cured epoxy resins possess superior thermal, oxidative and ultraviolet radiation stability, as compared to cured epoxy resins obtained employing conventional curing agents.

The organophosphorus - nitrogen compounds which effectively function as curing or cross linking agents for epoxy resins according to the invention are organophosphorus amides having the

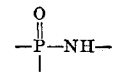

group, and free of primary amino groups which are not connected to phosphorus. Thus, suitable curing agents for purposes of the invention are those which do not contain a primary amino group, for example, on a carbon atom of an alkyl group or of an aromatic group, in the organic portion of the molecule. The reason for avoiding the presence of such free amino groups in positions other than directly connected to a phosphorus atom, is noted more fully hereinafter.

More specifically, the organophosphorus amides employed as curing agents according to the invention are materials selected from the group consisting of compounds having the formula

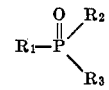

and polymeric compounds having a plurality of recurring units having the formula

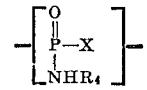

where $R_1$ is selected from the group consisting of alkyl, aryl, O-alkyl, O-aryl, NH-alkyl, NH-aryl; $R_2$ is selected from the group consisting of $NH_2$, NH-alkyl, NH-aryl, alkyl, aryl; $R_3$ is selected from the group consisting of $NH_2$, NH-alkyl, NH-aryl; and $R_4$ is selected from the group consisting of alkyl, and aryl; and X is selected from the group consisting of O and $>NR_4$.

The above noted alkyl groups can be straight chain or branched chain alkyl groups and can contain from 1 to about 8 carbon atoms. The above noted aryl groups can be groups such as phenyl, naphthyl, anthracenyl, and the like. Further, such alkyl and aryl groups can be unsubstituted or substituted with various substituents such as halogens, e.g., chlorine, bromine, fluorine, and the like; alkylamino, arylamino, and the like; alkoxy and aryloxy groups such as methoxy, ethoxy and phenoxy groups, the groups

cyano, and the like. It is preferred not to employ substituents which would react with an epoxy group faster than the —PNH— group. Hence, for example, as previously indicated, the amino radicals of such alkylamino and arylamino substituents should not be a primary amino group.

Various groups within the scope of the organophosphorus amides defined above can be employed. Thus, there is provided, according to the invention, one group of curing agents defined by the general formulae set forth above wherein $R_1$ is O-alkyl or O-aryl, and $R_2$ and $R_3$ are $NH_2$ NH-alkyl or NH-aryl. Another group of curing agents within the broad class defined above are those wherein $R_1$, $R_2$ and $R_3$ are NH-alkyl or NH-aryl. Still another group of compounds are those wherein $R_1$ is alkyl or aryl, and $R_2$ and $R_3$ are $NH_2$, NH-alkyl or NH-aryl.

Although the curing agents of the invention can contain a single amido group, that is, a single $NH_2$, NH-alkyl or NH-aryl group connected to phosphorus, in preferred practice for obtaining cured resinous products, particularly cured epoxy resins having superior toughness, and superior thermal, oxidative and ultraviolet radiation stability, as well as affording greater ease and rapidity of curing, the organophosphorus amides of the invention should contain at least two such amido groups. Generally and preferably, such plurality of amido groups are all connected to the same phosphorus atom, particularly, of course where the curing agent contains but one P atom in the molecule. However, where the curing agent contains two or more phosphorus atoms in the molecule, for example, where $R_1$ is an O-alkyl group or an O-aryl group which in turn carries a substituent

group as noted above, such as, for example, the substituent

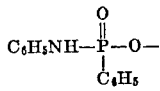

group, as illustrated in the examples set forth below, one or more of such amido groups can be connected to one phosphorus atom and one or more such amido groups can be connected to another phosphorus atom of the molecule.

It has been found also that those curing agents defined above having one or more aryl, e.g., phenyl, groups impart greater thermal and ultraviolet light stability and toughness, and increased fire retarding properties to the resulting cured resin product, the improvement in these properties being essentially a monotonic function of the aromatic content of the curing agent. Thus, the greater the number of aromatic, e.g., phenyl, groups in the molecule the greater is the superiority in the overall properties of the cured resins.

Specific examples of organophosphorus-nitrogen curing agents according to the invention are as follows:

(1) $CH_3OP(NH_2)_2$ with =O on P 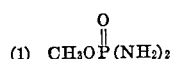

(2) $C_4H_9OP(NH_2)_2$ 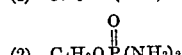

(3) $C_2H_5OP(NHCH_3)_2$ 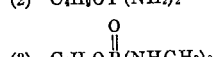

(7) $(C_6H_5NH)_2PCC_6H_4OP(NHC_6H_5)_2$ 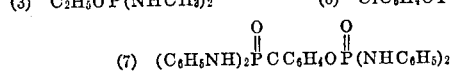

(4) $C_6H_5OP(NHC_2H_5)_2$ 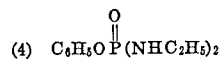

(5) $C_6H_5OP(NHC_6H_5)_2$ 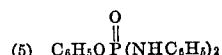

(6) $ClC_6H_4OP(NHC_6H_5)_2$ 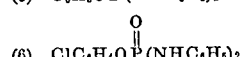

(8) $C_6H_5O\underset{C_6H_5}{\overset{O}{\overset{\|}{P}}}-NHC_6H_5$ 

(17) $C_2H_5P(NH_2)_2$ with =O 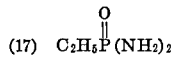

(9) $C_6H_5NH-\underset{C_6H_5}{\overset{O}{\overset{\|}{P}}}OC_6H_4O\underset{C_6H_5}{\overset{O}{\overset{\|}{P}}}-NHC_6H_5$ 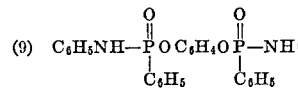

(18) $C_6H_5P(NH_2)_2$ 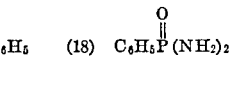

(10) $C_2H_5O\underset{C_2H_5}{\overset{O}{\overset{\|}{P}}}-NHC_6H_5$ 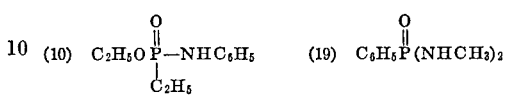

(19) $C_6H_5P(NHCH_3)_2$ 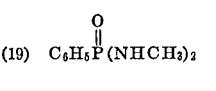

(11) $(C_6H_5NH)_3P=O$

(20) $C_6H_5P(NHC_6H_5)_2$ 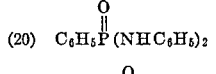

(12) $(Cl_2C_6H_3NH)_3P=O$

(21) $ClC_6H_4P(NHCH_3)_2$ 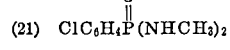

(13) $(CH_3NH)_3P=O$

(22) $BrC_6H_4P(NHC_6H_5)_2$ 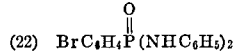

(14) $(C_2H_5NH)_3P=O$

(23) $CH_3OC_6H_4P(NHC_2H_5)_2$ 

(15) $(CH_3OC_6H_4NH)_3P=O$

(24) $C_2H_5OC_6H_4P[NHC_6H_4NHCH_3]_2$

(16) $(BrC_6H_4NH)_3P=O$

(25) $CH_3C_6H_4P[NHC_6H_4N(CH_3)_2]_2$

(26) $C_4H_9P(NHC_4H_9)_2$ with =O

(27) $C_4H_9P(NHC_6H_5)_2$ with =O

(28) $C_4H_9P[NHC_6H_4N(CH_3)_2]_2$ with =O

(29) $Br_2C_6H_3P(NHC_6H_3Br_2)_2$ with =O

(30)
$$-\overset{O}{\overset{\|}{P}}-\underset{\underset{CH_3}{|}}{\overset{CH_3}{\overset{|}{N}}}-\left[\overset{O}{\overset{\|}{P}}-\underset{\underset{CH_3}{|}}{\overset{CH_3}{\overset{|}{N}}}-\right]_x\overset{O}{\overset{\|}{P}}-\underset{\underset{CH_3}{|}}{\overset{CH_3}{\overset{|}{N}}}-$$
with NH below each

(31)
$$-\overset{O}{\overset{\|}{P}}-\underset{\underset{NHC_2H_5}{|}}{\overset{C_2H}{\overset{|}{N}}}-\left[\overset{O}{\overset{\|}{P}}-\underset{\underset{NHC_2H_5}{|}}{\overset{C_2H_5}{\overset{|}{N}}}-\right]_x\overset{O}{\overset{\|}{P}}-\underset{\underset{NHC_2H_5}{|}}{\overset{C_2H_5}{\overset{|}{N}}}-$$

(32)
$$-\overset{O}{\overset{\|}{P}}-O-\underset{NHC_6H_5}{|}\left[\overset{O}{\overset{\|}{P}}-O\underset{NHC_6H_5}{|}\right]_x\overset{O}{\overset{\|}{P}}-O-\underset{NHC_6H_5}{|}$$

As previously noted, those compounds set forth above which contain one or preferably a plurality of phenyl groups, such as trisanilinophosphine oxide and phenylbisanilinophosphine oxide, Compounds 11 and 20, respectively, have been found particularly effective in producing cured epoxies of highly improved properties according to the invention.

The polymeric organophosphorus amides noted above and which can be employed as curing agents according to the invention are liquid to solid materials where $x$ in the polymeric compounds noted above can vary over a wide range, e.g., about 1 to about 20, and the end groups of such polymers can be alkyl or aryl groups, as illustrated above, e.g., methyl or phenyl groups. Such polymeric curing agents are generally more reactive with the epoxy resins for curing same, as compared to the monomeric organophosphorus amides noted above, due to the much larger number of reactive

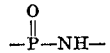

sites in each of the polymer molecules.

The amount of organophosphorus amide curing or cross-linking agent which can be employed in the epoxy resin formulations of the invention can vary over a wide range, depending upon the desired properties of the cured product and the ratio of reactive sites in the epoxy resin and in the phosphorus amide curing agent. For example, if there are two epoxide groups in the epoxy resin and two phosphorus amide groups in the curing agent, then a 1:1 ratio will generally suffice. In other words the number of phosphorus amide groups should be approximately equivalent to the number of epoxide groups. However, it will be recognized that less than theoretical cure reaction will occur with less than a theoretical or stoichiometric quantity of curing agent, and under such conditions a low modulus, highly damped resin will be formed. This is advantageous in certain instances, e.g. for certain potting applications where the coating must withstand high mechanical shock. Alternatively, using an excess of the phosphorus amide curing agent will optimize the fire retardant properties and ultraviolet radiation stability of the cured resin.

It is customary to express the ratio of curing agent to resin in terms of parts of curing agent per 100 parts of resin by weight, but it should be understood that the parts by weight are determined by the ratio of epoxy groups to the phosphorus amide groups, and the properties desired for the cured product. For example, the diglycidyl ether of bisphenol A (para, para′-isopropylidenediphenol) is available as a monomer or as a low molecular weight polymer, and the optimum amounts of trisanilinophosphine oxide, phenyl-bisanilinophosphine oxide, the methylaminophosphine oxide polymer, and phenyl-bis- aminophosphine oxide employed respectively, are shown in Table I below.

TABLE I.—DIGLYCIDYL ETHER OF BISPHENOL A $$CH_2CHCH_2\text{—}\left[O\text{—}\bigcirc\text{—}\underset{CH_3}{\overset{CH_3}{C}}\text{—}\bigcirc\text{—}OCH_2\overset{OH}{C}HCH_2\right]_n\text{—}O\text{—}\bigcirc\text{—}\underset{CH_3}{\overset{CH_3}{C}}\text{—}\bigcirc\text{—}OCH_2CHCH_2$$

| n | Epoxide Equivalent | Grams of curing agent per 100 grams of resin ||||
|---|---|---|---|---|---|
| | | $(C_6H_5NH)_3PO$ | $C_6H_5\overset{O}{\overset{\|}{P}}(NHC_6H_5)_2$ | $\left[\overset{O}{\overset{\|}{P}}\text{—}\underset{NHCH_3}{\overset{CH_3}{N}}\text{—}\right]_x$ | $C_6H_5\overset{O}{\overset{\|}{P}}(NH_2)_2$ |
| 0 | 170.2 | 63.2 | 90.5 | 62.3 | 22.9 |
| 1 | 312.4 | 34.5 | 49.4 | 34.0 | 12.5 |
| 2 | 454.6 | 23.7 | 33.9 | 23.4 | 8.6 |
| 3 | 596.7 | 18.1 | 25.8 | 17.8 | 6.5 |
| 4 | 738.9 | 14.6 | 20.9 | 14.4 | 5.3 |
| 5 | 881.1 | 12.2 | 17.5 | 12.0 | 4.4 |
| 6 | 1,023.3 | 10.5 | 15.1 | 10.4 | 3.8 |

Thus, it is readily apparent that the parts by weight of curing agent per 100 parts of resin can vary considerably depending on both the curing agent and the extent of polymerization of the epoxy resin. The data shown on Table I are for highly purified materials. However, many commercial epoxy materials are blended to provide materials with a convenient viscosity range. When this is the case, the epoxide equivalent will vary, and hence the amount of curing agent necessary will also vary.

Structural variation of the epoxy resin also has an effect on the quantity of curing agent necessary to cure epoxy compounds. Thus, the use of different epoxy resins, generally requires the use of different amounts of curing agent to effect a comparable cure, as illustrated in Table II below.

TABLE II

| | Epoxide equivalent | Grams of curing agent per 100 grams of resin ||||
|---|---|---|---|---|---|
| | | $(C_6H_5NH)_3PO$ | $C_6H_5\overset{O}{\overset{\|}{P}}(NHC_6H_5)_2$ | $\left[\overset{O}{\overset{\|}{P}}\text{—}\underset{NHCH_3}{\overset{CH_3}{N}}\text{—}\right]_x$ | $C_6H_5\overset{O}{\overset{\|}{P}}(NH_2)_2$ |
| Epoxy: | | | | | |
| A | 101 | 107 | 153 | 105 | 38.6 |
| B | 111 | 97.3 | 139 | 96.4 | 35.3 |
| C | 305 | 35.8 | 50.5 | 34.8 | 12.8 |
| D | 92.4 | 117 | 167 | 115 | 42.4 |
| E | 111 | 97.3 | 139 | 96.4 | 35.3 |
| F | 156 | 69.3 | 98.7 | 68.0 | 25.0 |

NOTE:
Epoxy A, Diglycidyl ether of butanediol.
Epoxy B, Diglycidyl ether of polychlorohydrin.
Epoxy C, Diglycidyl ether of tetrachloro bisphenol-A.
Epoxy D, Glycidyl ether, diglycidyl amine of p-aminophenol.
Epoxy E, Diglycidyl ether of resorcinol.
Epoxy F, Tetraglycidyl ether of tetraphenylene ethane.

Generally, the amount of phosphorus amide curing agent which can be employed can range from about 5 to about 160 parts, per 100 parts by weight of the epoxy resin, and usually is in the range of about 10 to about 100 parts of curing agent per 100 parts by weight of the epoxy material, for certain epoxy resins, for example, the diglycidyl ether of bisphenol-A or an epoxy novolac resin.

The organophosphorus amides described above can be prepared according to procedures described by G. M. Kosolapoff, in "Organophosphorus Compounds," John Wiley and Sons, New York, 1950, and in the Encyclopedia of Chemical Technology, Volume X, pp. 494–505, 1953. For example, trisanilinophosphine oxide can be prepared according to Equation 1.

(1)

$$POCl_3 + 6C_6H_5NH_2 \rightarrow (C_6H_5NH)_3PO + 3C_6H_5NH_3Cl$$

The aniline hydrochloride formed as a by-product can be separated from the product by solution in water.

The polymeric phosphorus amides described above can be prepared by the reaction of an alkylamine with phosphorus oxychloride (Equation 2).

(2)

The products of the reaction (Equation 2) are trismethylaminophosphine oxide, polymer, and methylammonium chloride. The phosphine oxide is soluble in benzene whereas the polymer is insoluble and therefore separation can be affected.

Mixed phosphorus ester-phosphorus amides can be prepared simply according to the process shown in Equations 3 and 4.

(3)

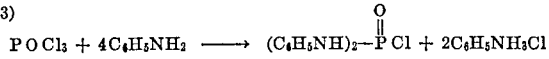

(4)

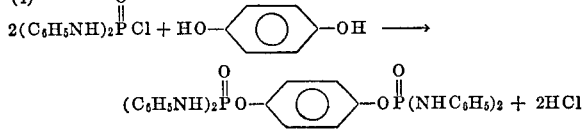

Phenyl bisamino phosphine oxides can be prepared by reaction of $C_6H_5$—$POCl_2$ with an excess of the appropriate amine to thereby obtain the amide product and an amine hydrochloride, according to the following illustrative equation:

(5)

$$C_6H_5POCl_2 + 4CH_3NH_2 \rightarrow C_6H_5PO(NHCH_3)_2 + 2CH_3NH_2 \cdot HCl$$

The epoxy resins or polyepoxides which are cured according to the invention principles includes those organic compounds containing a plurality of epoxy groups, i.e.,

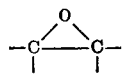

groups. These compounds may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

The epoxy material can be either a single type of epoxy having a plurality of epoxide groups, or a mixture of two or more different epoxies provided that at least one of the epoxy reactants has a plurality of epoxide groups.

Some suitable epoxies are epoxidized polyolefin, epoxidized soybean oil, limonene dioxide, bis-(2,3-epoxy-cyclopentyl) ether, vinylcyclohexene dioxide, 3,4-epoxy-6-methylcyclohexyl methyl -3,4-epoxy - 6 - methylcyclohexanecarboxylate, bis-(3,4-epoxy-6-methylcyclohexylmethyl) adipate, dicyclopentadiene dioxide, bis-(epoxydicyclopentylether) of ethylene glycol, butadiene dioxide, diglycidyl ether of butanediol, diglycidyl ether of polychlorohydrin, diglycidyl ether of a polyether, 1,3-bis-[3(2,3-epoxypropoxy) propyl] tetramethyldisiloxane, diglycidyl ether of bisphenol A, diglycidyl ether of tetrachlorobisphenol A, diglycidyl ether of resorcinol, diglycidyl ester of dimeric linoleic acid, triglycidyl ether of glycerol, triglycidyl ether of trihydroxyphenylpropane, p-N,N-diglycidylamino-phenylglycidyl ether, diglycidyl ether, glycidyl ester of 4,4-bis-(4-hydroxylphenyl)pentanoic acid, polyallylglycidyl ether, tetraglycidyl ether of tetrahydroxyphenylethane, epoxidized novolacs, and the like.

Preferred epoxies comprise the glycidyl ethers such as the glycidyl ethers of the phenols, e.g., the diglycidyl ether of bisphenol A, and the epoxy novolac resins.

The various polyepoxides or epoxy resins noted above are generally in the B-stage or are only partially polymerized when the curing or cross-linking agent of the invention is incorporated therein. The curing agent thereafter reacts with the epoxy groups of the epoxy resin, usually at elevated temperature, as pointed out more fully below, to polymerize and impart a final cure of the initially partially polymerized resin. The curing agent can be incorporated into the polyepoxide or epoxide resin either with or without the use of a diluent or solvent. The polyepoxide can be a solid or a liquid material but in the preferred epoxy formulations the epoxy resin is in liquid form.

The temperature and time necessary to obtain maximum cure will vary depending on the nature of the curing agent and/or the nature of the epoxy resin, and whether or not a catalyst is present in the reaction mixture. In general, for any given chemical reaction for a particular compound, the rate of reaction is increased with an increase in temperature. Some epoxy resins can be cured according to the invention at or near room temperature, whereas, temperatures up to about 300° C. will be needed for other systems. Also, a variety of reactions can occur within the epoxy resin-curing agent system depending on the temperature. For example, the first step in the curing of an epoxy resin is believed to be the reaction of the curing agent with an epoxide group, as indicated by the reaction below

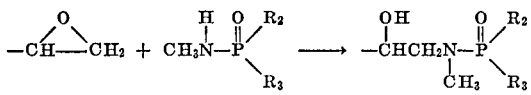

The phosphorus-amido alcohol thus formed in the first step of the reaction can undergo etherification at high temperatures to provide ether cross-links in the cured epoxy resin.

The cross-linking reaction between an epoxy and a curing agent of the invention is indicated below.

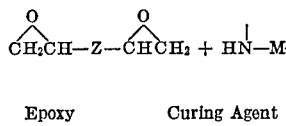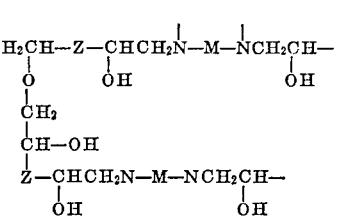

where Z represents the linking group between adjacent epoxy groups and M represents the phosphorus-containing moiety of the curing agent.

It is seen from the schematic course of the reaction noted above that reaction between the polyepoxide and the organophosphorus amide curing agents of the invention occurs between the amino or amido group attached directly to the phosphorus atom of the curing agent, and a carbon atom of an epoxy group of the polyepoxide. This results in highly stable linkages and provides cured crosslinked products possessing the improved properties noted above. On the other hand, if a compound or curing agent is employed which has a primary amino group attached to a carbon atom of the organic moiety of the organophosphorus compound, for example, connected to an alkyl group or to an aromatic group of the compound, such free amino group, and particularly a primary aromatic amino group or an amino group connected to a carbon atom of, for example, a phenyl nucleus, will first react with the epoxy groups of the epoxy resin, in preference to the amido group connected to the phosphorous atom, and cured epoxy resins of a different structure and having inferior properties to those produced employing the curing agents of the invention, will result.

The curing temperature for reaction of the invention curing agents with the polyepoxide can range from as low as about room temperature (about 20° C.) to as high as 275° C., depending in large measure on the particular organophosphorus amide curing agent employed. Usually, however, curing temperatures range from about 100 to about 225° C. The time period for curing can vary depending on various factors such as the particular curing agent employed, the temperature of the cure, and the particular epoxy resin being utilized. Thus, curing time can range from as little as five minutes to as much as six hours or more, but generally is in the range from about one half hour to about four hours. Where the curing agents employed according to the invention are the polymeric materials noted above, and as exemplified by the last three compounds in the list of examples given above, as previously noted, the reaction generally proceeds more rapidly than when employing the monomeric organophosphorus amides of the invention. Thus, when employing such polymeric curing agents the reaction can proceed at temperatures as low as about room temperature, and more rapidly at elevated temperatures.

In addition to the possibility of reactive hydroxyl groups, some epoxies contain reactive sites such as vinyl groups which can undergo cross-linking reactions, and alkylamino groups which can act as catalysts. Thus, it can be seen that the conditions of time and temperature necessary for maximum cure can vary considerably for each epoxy resin-curing agent system.

Some organophosphorus-nitrogen compounds of the invention are not readily soluble in epoxy resins and a solvent must be used to provide a homogeneous mixture. The solvent can be removed by the application of vacuum or it can be allowed to evaporate as the temperature of the mixture is raised during the initial stages of the cure reaction. Some suitable solvents are diethylether, dibutylether, tetrahydrofuran, dimethyltetrahydrofuran, benzene, toluene, xylene, mesitylene, ethylbenzene, chlorobenzene, dichlorobenzene, anisole, diphenylether, N-methylpyrrolidone, dioxane, acetonitrile, benzonitrile, chloroform, carbontetrachloride, perchloroethylene, dimethylformamide, dimethylacetamide, dimethylsulfoxide, pyridine, and the like.

Some of the organophosphorus-nitrogen curing agents which contain aromatic groups, react relatively slowly with epoxide groups to provide cured resins. In these cases a catalyst can be added to cause an increase in the rate of reaction. Alternatively, functional groups which exhibit catalytic activity such as dimethylamino groups can be an integral part of the epoxy resin or the curing agent. Some materials which will act as catalysts are:

(CH₃)₃N
(C₂H₅)₃N
(C₃H₇)₃N
(C₄H₉)₃N
N(C₂H₄)₃N
CH₃N(C₂H₄)₂O
C₅H₅N
C₁₂H₂₅N(CH₃)₃⁺OH⁻
(CH₃)₂NC₆H₅
o-S₆H₄(OH)CH₂N(CH₃)₂
2,4,6-[(CH₃)₂NCH₂]C₆H₂OH
(CH₃)₂NC(=NH)N(CH₃)₂
(CH₃)₂NCH(CH₃)CH₂CH₂N(CH₃)₂
(HOCH₂CH₂)₃N
[CH₃CH(OH)CH₂]₂NCH₂CH₂N[CH₂CH(OH)CH₃]₂
C₅H₁₁N
(C₂H₅)₂O:BF₃
C₂H₅NH₂:BF₃
N(CH₂CH₂O)₃B and the like.

As previously noted, the cured epoxy resins according to the invention have outstanding thermal, oxidative and ultraviolet radiation stability, important for structural materials. In addition, and particularly where the curing agents employed contain a substantial aromatic content, the cured materials are more fire resistant and also have higher modulus and load carrying characteristics. This is particularly true where the cured resin is employed for impregnation of fibrous materials such as fiber glass sheets.

In addition to application to a substrate for producing a coating of good structural strength and high stability and which has high adhesion to materials such as aluminum and glass, the cured epoxy resins according to the invention are useful as adhesives, and in the production of laminate and filament winding materials.

The epoxy systems or resins having the organophosphorus amide curing agent according to the invention, dispersed therein, are particularly valuable in the production of laminates. Hence, for example, laminates of various materials including both non-fibrous synthetic resinous materials, e.g., sheets of the resins listed below, and also fibrous textile materials, particularly sheets of glass cloth, matting, asbestos, cotton duck and the like, can be bonded together employing the epoxy formulation of the invention in a partially cured form, and such laminates containing said epoxy formulation can be finally cured by subjected the laminate usually to elevated temperature to cause reaction of the curing agent with the epoxy groups of the epoxy resin.

A particularly important application of the epoxy system of the invention is as an adhesive and as a coating and impregnating composition. Thus, the epoxy system hereof can be used as a coating on non-fibrous tapes or base films formed of resins or plastics such as polyethylene, polypropylene, Mylar (polyethylene terephthalate), Teflon (polytetrafluoroethylene), vinyls such as polyvinyl chloride, polystyrene, polycarbonates, and acetates such as cellulose acetate or cellulose acetate-butyrate. The epoxy system of the invention is also useful for the impregnation of tapes of fibrous materials, especially for the impregnation of fiber glass tapes for use in the production of filament or tape wound pressure vessels. Thus, for example, an impregnated fiber glass cloth tape according to the invention can be prepared by dipping the fiber glass cloth into a mixture or solution of an epoxide and curing agent.

Where the epoxy resin-organophosphorus amide curing agent system is one which is curable at elevated temperature, as is usually the case, the reels of tapes impregnated with the epoxy resin-phosphorus amide curing agent system of the invention can be maintained or stored at approximately room temperature without setting up or curing of the epoxy occurring. When the tape is used for producing a winding for a pressure vessel, the backing paper between adjacent tape surfaces is removed as the tape is unwound from the reel and is wound on a mandrel for the production of such pressure vessel or winding. The wound structure can then be subjected to a suitable elevated temperature for a suitable time period sufficient to completely cure the epoxy resin.

phosphorus amide curing agents according to the invention and the respective formulations cured at the temperatures and for the time periods set forth in Table III below. The properties of the cured resins obtained are also set forth in Table III.

TABLE III

| Example | Curing agent | Ratio resin/ curing agent | Curing temp., °C. | Time, hrs. | Thermal softening range, °C. | Remarks |
|---|---|---|---|---|---|---|
| II | $C_6H_5P(O)(NH_2)_2$ | 100:23 | 121 | 4 | 60–80 | Dark brown. |
| III | $C_6H_5P(O)(NHCH_3)_2$ | 100:47 | { 94<br>{ 177 | 2<br>2 | 130–150}<br>130–150} | Light brown, good adhesion to metals. |
| IV | Polymer having recurring units $\left[ \begin{array}{c} O \\ \parallel \\ -P-N- \\ \mid \quad \mid \\ NH \quad CH_3 \\ \mid \\ CH_3 \end{array} \right]$ | 100:27 | 200 | 2 | 140–160 | Dark brown, good adhesion to metals. |

When the epoxy formulation is employed for coating a substrate such as a glass or metal surface, the resin formulation containing the curing agent of the invention is applied to the surface of the coating either by dipping the substrate in the epoxy formulation containing the organophosphorus amide curing agent, or by applying the formulation by brush or other suitable method of application.

The following are examples of practice of the invention. The term "parts" appearing in the examples is intended to denote parts by weight.

EXAMPLE I 100 parts of a novolac epoxy resin are mixed with 50 parts of trismethylaminophosphine oxide at room temperature, and the mixture is applied to an aluminum surface. When the mixture is heated at 140° C. for 15 minutes, gelation occurs. On heating the gelled resin at 160° C. for 2 hours and then at 180° for 5 hours, a tough, amber resin with good adhesion to the aluminum is obtained.

EXAMPLES II TO IV

A novolac epoxy resin is mixed with various organophosphorus amide curing agents according to the invention and the respective formulations cured at the temperatures and for the time periods set forth in Table III below. The properties of the cured resins obtained are also set forth in Table III.

EXAMPLE V

Phenyl bisanilinophosphine oxide (51.6 parts) is mixed with 100 parts of the diglycidyl ether of bisphenol-A. Aluminum and glass panels are dipped into the mixture to coat the surfaces thereof, and the panels are heated for 31 minutes at 190° C. A cured epoxy resin results which is clear amber in color and exhibits excellent adhesion to the aluminum and glass panels.

EXAMPLES VI TO XVI

The diglycidyl ether of bisphenol-A is mixed with various organophosphorus amide curing agents according to the invention, and the respective formulations cured according to the data shown in Table IV below. The results of such curing are also set forth in Table IV.

TABLE IV

| Example | Curing agent | Ratio curing agent to resin | Curing Time, min. | Curing Temp., °C. | Remarks |
|---|---|---|---|---|---|
| VI | $C_6H_5P(O)(NHC_6H_5)_2$ | 51.6/100 | 31 | 190 | Mixture cures to a tough, amber solid. |
| VII | Polymer having recurring units $\left[ \begin{array}{c} O \\ \parallel \\ -P-N- \\ \mid \quad \mid \\ NHCH_3 \; CH_3 \end{array} \right]$ | 36.7/100 | 2.5 | 150 | Cures to tough resin. |
| VIII | Same as above | 36.7/100 | 60 | 95 | Do. |
| IX | do | 55.0/100 | 13 | 120 | Do. |
| X | do | 36.7/100 | 53 | 108–120 | Do. |
| XI | do | 36.7/100 | 25 | 122 | Do. |
| XII | $(CH_3NH)_3PO$ | 9.07/100 | 87.5 | 150 | Cures to tough, amber solid. |
| XIII | $(CH_3NH)_3PO$ | 9.07/100 | 205 | 122 | Do. |
| XIV | $(CH_3NH)_3PO$ | 9.07/100 | 100 | 130 | Do. |
| XV | $(CH_3NH)_3PO$ | 9.07/100 | 120 | 150 | Cures to rubbery solid. |
| XVI | $(CH_3NH)_3PO$ | 9.07/100 | 25 | 185 | Cures to tough, dark solid. |

EXAMPLES XVII TO XXI

The tetraglycidyl ether of tetrahydroxyphenyl ethane is mixed with the respective curing agents noted in Table V below, and such formulations are cured under the temperature and time conditions noted in Table V below. The results in terms of the cured products obtained are set forth in Table V.

TABLE V

| Example | Curing agent | Ratio curing agent/ resin | Curing Time, min. | Curing Temp., °C. | Remarks |
|---|---|---|---|---|---|
| XVII | $C_6H_5P(O)(NHC_6H_5)_2$ | 1:1 | 240 | 150 | Gels after 20 min. at 150° C. Complete cure requires 4 hours. |
| XVIII | $(C_6H_5NH)_3PO$ | 1:1 | 2.5 | 230 | Extremely rapid cure. |
| XIX | $(C_6H_5NH)_3PO$ | 0.25:1 | 20 | 230 | Slightly tacky. |
| XX | $(C_6H_5NH)_3PO$ | 1:1 | 6 | 169 | Tack-free, tough cured resin. |
| XXI | $(C_6H_5NH)_3PO$ | 1:1 |  | 150 | Very slow cure. |

EXAMPLE XXII

Stoichiometric quantities of diethylenetriamine and Epon 828 (epichlorohydrin-bisphenol-A condensation product) are thoroughly mixed and the mixture spread on an aluminum coupon 1.5 x 1.0 inch. The coated coupon is placed in an oven at 50° C. overnight to cure the epoxy. In a similar manner, a coated coupon is prepared with trisanilinophosphine oxide-cured Epon 828.

The two coated coupons are placed in a vacuum chamber and irradiated with high intensity ultraviolet light for 6.5 hours. The temperature rises from room temperature to 100° C. during the test.

The diethylenetriamine cured epoxy coating blisters, cracks, and causes the aluminum coupon to buckle. There is no observable change in the trisanilinophosphine oxide-cured epoxy coating, indicating the superior characteristics, particularly the ultraviolet radiation stability, of the phosphorus amide cured epoxy.

EXAMPLE XXIII

Fiber glass cloth is dipped into a stoichiometric mixture of Epon 828 and trisanilinophosphine oxide and the impregnated cloth which results is rolled into a roll whose diameter is slightly greater than 0.5 inch. The roll is placed in a cylindrical die, and heated at 200° C. at 200 p.s.i. for 20 minutes resulting in a strong fiber glass reinforced composite rod.

EXAMPLE XXIV

Cured resins having properties similar to those in Examples V, VI, and XVII to XXI are obtained by employing as the epoxy resins thereof the following curing agent according to the invention.

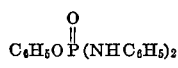

EXAMPLE XXV

An impregnated fiber glass cloth tape prepared as described in Example XXIII is wound on a mandrel to form a pressure winding at room temperature. The winding is then heated at approximately 200° C. for about 20 minutes, resulting in a strong epoxy-impregnated fiber glass pressure vessel.

From the foregoing, it is seen that the invention provides epoxy systems containing certain organophosphorus amide curing agents, which react with epoxy groups usually at elevated temperatures to provide a strong bond by cross-linking. The cured resins thus produced have superior thermal, oxidative and ultraviolet radiation stability as compared to epoxy systems cured by prior art or conventional curing agents, catalysts and the like. The epoxy systems of the invention are useful in the production of highly resistant and tough coatings, adhesives, laminates and electrical insulation materials.

Although the organophosphorus amides are particularly effective as curing or cross-linking agents for epoxy resins, such materials are also applicable for the curing of other elastomers such as chloroprene and acrylonitrile rubbers.

It will be understood that various modifications and adaptations of the invention can be made without departing from the spirit of the invention, and the invention accordingly is not to be taken as limited except by the scope of the appended claims.

I claim:

1. A composition capable of forming a tough resinous product having high thermal, oxidative and ultraviolet radiation stability, which comprises a polyepoxide having a plurality of

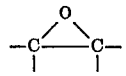

groups, and an organophosphorus amide, wherein said organophosphorus amide is present in an amount from about 5 to about 160 parts, per 100 parts by weight of said polyepoxide, and said organophosphorus amide is selected from the group consisting of compounds having the formula

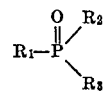

and polymeric compounds having a plurality of recurring units having the formula

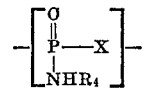

where $R_1$ is selected from the group consisting of alkyl, aryl, O-alkyl, O-aryl, NH-alkyl, and NH-aryl; $R_2$ is selected from the group consisting of $NH_2$, NH-alkyl, NH-aryl, alkyl, and aryl; $R_3$ is selected from the group consisting of $NH_2$, NH-alkyl, and NH-aryl; $R_4$ is selected from the group consisting of alkyl and aryl, and X is selected from the group consisting of O and $>NR_4$.

2. A composition as defined in claim 1, wherein said organophosphorus amide is the compound $$(C_6H_5NH)_3P=O$$

3. A composition as defined in claim 1, wherein said organophosphorus amide is the compound

4. A composition as defined in claim 1 wherein said polyepoxide is the diglycidyl ether of bisphenol A, wherein said organophosphorus amide is present in an amount from about 10 to about 100 parts, per 100 parts by weight of said polyepoxide, and said organophosphorus amide is the compound $(C_6H_5NH)_3P=O$.

5. A composition as defined in claim 1, wherein said polyepoxide is the diglycidyl ether of bisphenol A, wherein said organophosphorus amide is present in an amount from about 10 to about 100 parts, per 100 parts by weight of said polyepoxide, and said organophosphorus amide is the compound

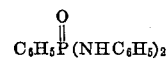

6. A composition as defined in claim 1 wherein said polyepoxide is an epoxy novolac resin, wherein said organophosphorus amide is present in an amount from about 10 to about 100 parts, per 100 parts by weight of said polyepoxide, and said organophosphorus amide is the compound $(C_6H_5NH)_3P=O$.

7. A composition as defined in claim 1 wherein said polyepoxide is an epoxy novolac resin, wherein said organophosphorus amide is present in an amount from about 10 to about 100 parts, per 100 parts by weight of said polyepoxide, and said organophosphorus amide is the compound

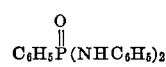

8. The resinous product of the reaction between a polyepoxide having a plurality of

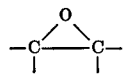

groups, and an organophosphorus amide, wherein said organophosphorus amide is present in an amount from about 5 to about 160 parts, per 100 parts by weight of said polyepoxide, and said organophosphorus amide is selected from the group consisting of compounds having the formula

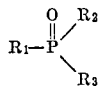

and polymeric compounds having a plurality of recurring units having the formula

where $R_1$ is selected from the group consisting of alkyl, aryl, O-alkyl, O-aryl, NH-alkyl, and NH-aryl; $R_2$ is selected from the group consisting of $NH_2$, NH-alkyl, NH-aryl, alkyl, and aryl; $R_3$ is selected from the group consisting of $NH_2$, NH-alkyl, and NH-aryl; $R_4$ is selected from the group consisting of alkyl and aryl; and X is selected from the group consisting of O and $>NR_4$.

9. The resinous product as defined in claim 8, wherein said organophosphorus amide is the compound $$(C_6H_5NH)_3P=O$$

10. The resinous product as defined in claim 8, wherein said organophosphorus amide is the compound

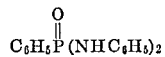

References Cited

UNITED STATES PATENTS

| | | |
|---|---|---|
| 3,134,784 | 5/1964 | Seeger et al. |
| 3,226,382 | 12/1965 | Seeger et al. |
| 3,385,914 | 5/1968 | Hindersinn et al. |

OTHER REFERENCES

Lee et al., "Epoxy Resins," p. 236 relied on, McGraw-Hill Book Co., Inc., New York, 1957.

WILLIAM H. SHORT, Primary Examiner

T. E. PERTILLA, Assistant Examiner

U.S. Cl. X.R.

117—124, 127; 161—185, 186; 260—2, 18, 59